Jan. 15, 1924.
D. C. KLAUSMEYER
SAFETY HAND FEED
Filed May 8, 1923
1,481,245
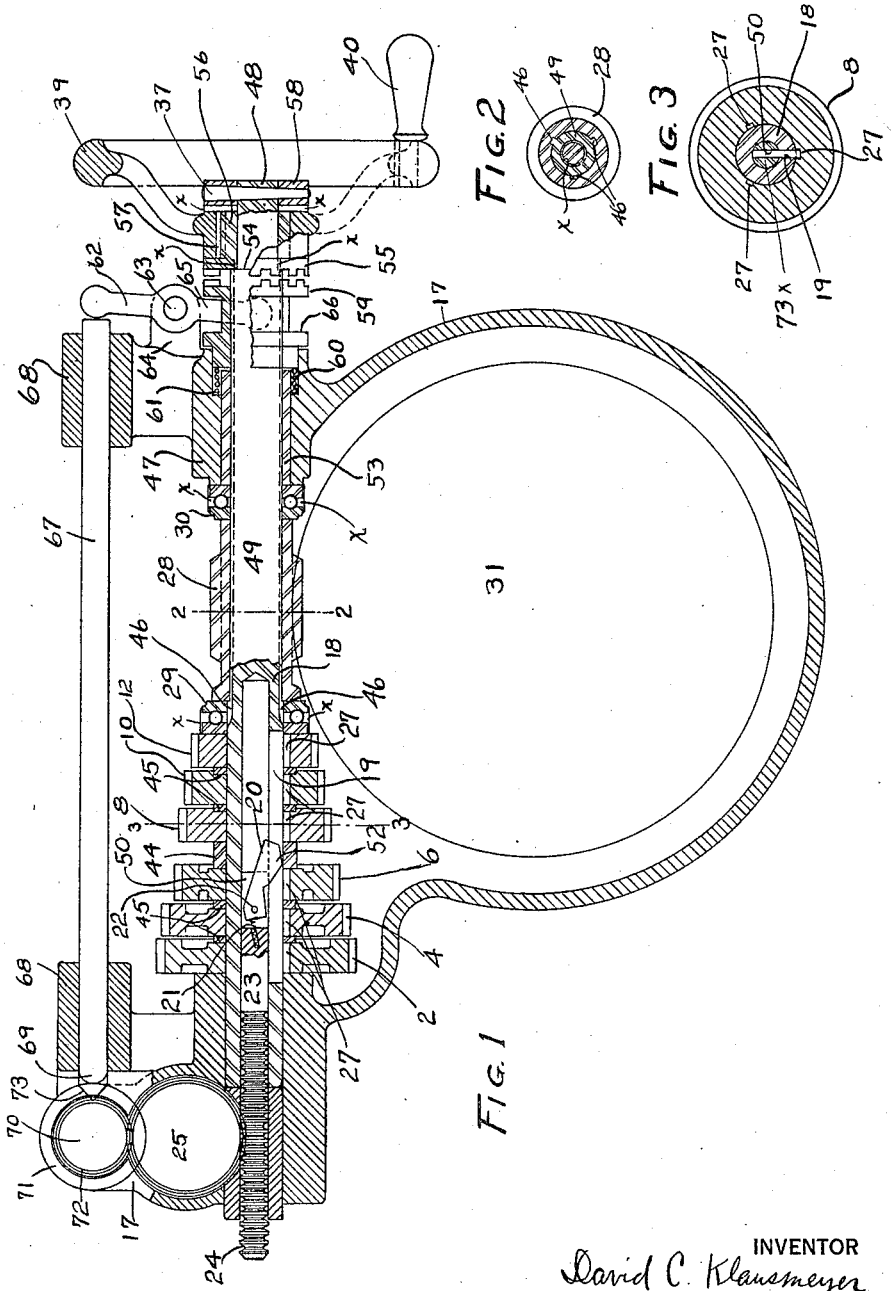
INVENTOR
David C. Klausmeyer
BY
Albert F. Nathan
ATTORNEY Patented Jan. 15, 1924.

1,481,245

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

SAFETY HAND FEED.

Application filed May 8, 1923. Serial No. 637,497.

*To all whom it may concern:*

Be it known that I, DAVID C. KLAUSMEYER, a citizen of the United States, and residing at Cincinnati, in the county of Hamilton and State of Ohio, have invented a new and Improved Safety Hand Feed, of which the following specification is a full disclosure.

This invention relates to a sub-combination in the organization of power-drills providing a variety of speeds for advancing the drill into its work; the invention making provision for a manual feed; and the mechanism being such that the hand-wheel cannot derive motion from the power.

In drilling machines the conventional spindle-feeding mechanism combines a driven-shaft with a hand-wheel for manual operation and with a plurality of gears arranged for actuation by power at speeds differing from each other, and means to connect said gears selectively with the driven-shaft so that the spindle can be actuated at the desired speed, the preferred type of such selecting means embodying a shift-rod passing axially through the change-speed gears, being provided with a dive-key to be coupled with any one only of the gears, the shift-rod being formed with a circular rack operated manually by a pinion meshing with the rack.

The objective of the present invention is to provide a safety interlock operating automatically to disconnect the hand-wheel from the driven-shaft when any of the power-operated gears is connected thereto, so that the operator will not be endangered by rotation of the hand-wheel by power at the high speeds characteristic of such machines, which are such as to cause the hand-wheel to rotate at from three hundred to five hundred revolutions per minute. This constitutes a dangerous menace to the operator, as the hand-wheel is necessarily an exposed element.

A further objective of this invention is to provide means for coupling the hand-wheel with the driven-shaft at times, to permit manual actuation of the driven-shaft for feeding the drill-spindle, and to co-ordinate this coupling means with the safety interlock in such a manner that the hand-wheel will be coupled automatically with the driven-shaft at such times as the power-actuated gears have been disconnected from the driven-shaft, and only during such periods of disconnection.

An objective of cognate importance is to form the coupling-means as a clutch provided with a spring tending constantly to couple the hand-wheel with the driven-shaft, and with a clutch-shifting member actuated by a slide-rod operated by a rotatable control-member in mesh with the pinion which actuates the gear-shift-rod, the safety interlock so constituted being easy to assemble, inspect and remove or replace when it is necessary to adjust or repair its parts, which are of simple, strong construction, few in number and readily accessible to the operator.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 is a transverse section taken through that portion of a drilling machine which involves the feeding mechanism and the means for varying the rate of feed under power, as well as the hand-wheel for manually accomplishing the advance of the drill-spindle. Fig. 2 is a minor section in the plane of line 2—2 while Fig. 3 is a minor transverse section in the plane of the line 3—3.

The frame or casing is of appropriate contour as indicated by 17. In this frame is suitably mounted a worm-wheel 31 which is indicated diagrammatically and represents a conventional element forming a part of a spindle feeding arrangement such as may be utilized for advancing the spindle of a drilling machine, as will be readily understood by those skilled in the art. The worm-wheel 31 may be driven by power or manually through the medium of a tubular shaft 18 which is appropriately journaled at its ends in the frame 17 and is provided with a worm 28 permanently in mesh with the aforesaid worm-wheel 31, and keyed to the tubular shaft 18 by the three integral keys 46 machined upon the intermediate portion 49 of the shaft 18 as shown clearly in Fig. 2, or the worm 28 may be connected to the tubular shaft in any other suitable manner.

A variety of power speeds may be imparted to the shaft 18 through the instrumentality of a nest of spur-gears 2, 4, 6, 8, 10 and 12 loosely mounted on the hollow shaft 18 so as to rotate freely thereon except when independently engaged therewith. This engagement is effected by means of a dive-key 20 which can be shifted from point to point. The shifting of the dive-key is accomplished by a shift-rod 23 extending through the bore of the shaft 18 and adapted to rotate therewith in its various longitudinal positions, and the shift-rod 23 is formed at its rear end 24 with a circular rack in mesh with a pinion 25 journaled in the frame 17 and capable of being turned by a suitable hand-wheel or lever (not shown), acting to shift the rod 23.

Being circular, the rack 24 may rotate continuously in engagement with the pinion 25 without altering its longitudinal position and any rotation of the pinion 25 will, in like manner, control the longitudinal position of the rod 23 so that movement may be effected when the parts are rotating as well as when they are stationary.

The shift-rod 23 has a diametral slot 50 in which is contained the dive-key 20, the latter being flat and held in place by a pivot 22. An expansile spring 21 is contained in a socket 51 in the shift-rod 23 and this spring bears against a part of the dive-key so as to urge its tongue 52 radially outward. This tongue passes through a radial slot 19 formed through the wall of the tubular shaft 18.

Each of the gears on the shaft 18 is provided with one or more key-ways 27 so that the tongue 52 of the dive-key 20 may, under the pressure of the spring 21, enter the key-way in any one of the gears 2, 4, 6, 8, 10 or 12, according to the position of the shift-rod 23, and thus lock the particular gear selected to the tubular shaft 18 and cause that shaft to be rotated at the particular speed determined by the gear then in an operative connection. In order to avoid any interference when the dive-key is being moved from gear to gear, a separator 45 intervenes between adjoining gears and these separators are respectively in the form of a flat annular ring which is journaled loosely on the hollow shaft 18 and has the diameter of its bore only very slightly greater than the shaft 18. In consequence of the separators 45, the dive-key 20 is caused to withdraw entirely from the key-way in any one gear before it is permitted to enter the key-way of any adjacent gear and thus there can be no interference when the rate of feed is being changed.

To reduce the friction of the end-thrust of the worm 28, a ball-bearing 30 may be employed, and a like bearing 29 reduces the tendency of the gears to rotate the worm and shaft when the power is disengaged.

The above described nest of gears may be driven by power from any suitable source, such as a co-operating set of change-speed gears of the type and arrangement shown in my co-pending application, Serial Number 623,191, to which reference may be had for a description thereof, and in general the parts above described may, and preferably will, correspond with similar parts bearing the same reference characters in the aforesaid application.

Similarly, the manual feed is accomplished by means of a hand-wheel 39, which may be provided with the usual handle 40 and which is journaled loosely on the reduced end 48 of the tubular shaft 18 and the connection between the hand-wheel and the worm-supporting shaft 18 is established and broken automatically according to whether or not the change-gears are disconnected or connected, as the case may be, with the shaft 18.

For this purpose a safety-interlock is provided, in accordance with the present invention, which is of a specifically different form from that comprehended by the aforesaid co-pending application, but which is of the same generic character and comes within the scope of the broad claims in the aforesaid application.

The safety interlock comprehended by the present invention comprises a clutch embodying co-operating clutch-members 55 and 59, the clutch member 55 having a hub 56 journaled loosely upon the reduced end 48 of the shaft 18, where it is held in place between a shoulder 54 and a collar 58, the latter being secured in place by a pin 37 extending through the end 48, and the hub of the hand-wheel 39 is splined at 57 upon the hub 56 of the clutch member 55, so that they are connected rotatively.

The clutch member 59 is connected rotatively with the portion 49 of the shaft 18 by the keys 46 upon the shaft portion 49, and at 60 an expansile spring is shown, within a recess 61 of the frame portion 47, this spring tending normally to force the clutch member 59 into engagement with the clutch member 55, and when so engaged the hand-wheel 39 may be operated to rotate the shaft 18 and worm 28, to rotate the worm-wheel 31 for hand-feeding of the drill spindle.

In order to prevent such engagement of the clutch members 55 and 59 at times when the shaft 18 is to be rotated by power, and when therefore it is desired to disconnect the hand-wheel 39 so that it will not be rotated by power, and endanger the operator, a controlling device is provided comprising a lever 62 mounted pivotally at 63 upon a bracket 64 extending from the frame member 47, the lever having a fork 65 entering the annular notch 66 formed in the clutch member 59, and the free end 62 of the lever is extended into position for engagement by a slide rod 67 mounted in bearings 68 forming part of the frame structure, the other end 69 of the rod 67 being positioned against the periphery 71 of a rotatable control-member 70 geared at 72 to the pinion 25 which operates the shift-rod 23.

Fig. 1 shows the above described parts in a relative position which constitutes the neutral position of the power actuated gears 2, 4, 6, 8, 10 and 12, with the dive-key 20 supported upon the collar 44, so that the gears will rotate freely upon the shaft 18, none of them being connected thereto. In this position alone, can the hand-wheel 39 be connected with the shaft 18 by operation of the clutch member 59 under the action of the spring 60, and to permit such movement of the clutch member 59, the rotatable member 70 of the safety interlock is shown as having at 73 a peripheral notch, which is indicated as standing at the moment opposite the rounded end 69 of the control rod 67, so that in this position of the parts the spring 60 can force the clutch member 59 into engagement with the clutch member 55, because the lever 62 will force the end 69 of the rod 67 into the notch 73, and thereupon the hand-wheel 39 may be operated for manual feed of the drill spindle 31 as hereinbefore described.

When it is desired to initiate power-feeding, the operator turns the pinion 25, which causes the rotatable member 70 to be turned by action of the gear 72, and the walls of the tapered notch 73 act upon the rounded end 69 of the rod 67 to eject the same, throwing the rod 67, lever 62 and clutch member 59 to disconnect the latter from the clutch member 55, leaving the hand-wheel 39 disconnected, and this disconnection is maintained automatically during the period when the end 69 of the rod 67 is engaged with the continuous portion of the periphery 71 of the rotatable control member 70.

The parts are so proportioned, that the pinion 25 can be rotated in either direction from the intermediate position shown, in order to move the shift rod 23 toward the right-hand, to bring the dive-key 20 into coupling engagement with either of the gears 8, 10 or 12, or the rod 23 may be moved toward the left, to couple either one of the gears 6, 4 or 2.

It will thus be seen that the above construction provides a simple and effective safety interlock to prevent conflicting action of the hand and power feeding devices, thus eliminating danger to the operator, and also a construction and arrangement of parts such that the parts may be assembled readily, or inspected and repaired as occasion may arise.

Without further analysis, the foregoing will so fully reveal the gist of this invention that others can, by applying current knowledge, readily adapt it for various utilizations by retaining one or more of the essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A safety control for drilling machines; combining a spindle-feeding mechanism including a driven shaft; a plurality of gears arranged for actuation by power; means to connect said gears selectively with said driven-shaft, for power actuation thereof, said means including a shift-rod provided with a key and having a circular rack, and a rotatable pinion meshing with said rack; a hand-wheel journalled adjacent to said driven-shaft; means to couple said hand-wheel operatively with said driven shaft at times; and a safety interlock comprising connections between said pinion and coupling-means, said safety interlock operating to disconnect said handwheel from said driven-shaft when any of said gears are connected thereto, and to connect said hand-wheel with said driven-shaft when said gears are disconnected therefrom.

2. A safety control for drilling machines; combining a spindle-feeding mechanism including a driven shaft; a plurality of gears arranged for actuation by power; means to connect said gears selectively with said driven-shaft, for power actuation thereof, said means including a shift-rod provided with a key and having a circular rack, and a rotatable pinion meshing with said rack; a hand-wheel journalled adjacent to said driven-shaft; means to couple said hand-wheel operatively with said driven shaft at times; and a safety interlock comprising a control-member rotatable with said pinion and connections intermediate said rotatable control member and said coupling-means, said safety interlock operating to disconnect said hand-wheel from said driven-shaft when any of said gears are connected thereto, and to connect said hand-wheel with said driven-shaft when said gears are disconnected therefrom.

3. A safety control for drilling machines; combining a spindle-feeding mechanism including a driven shaft; a plurality of gears arranged for actuation by power; means to connect said gears selectively with said driven-shaft, for power actuation thereof; said means including a shift-rod provided with a key and having a circular rack, and a rotatable pinion meshing with said rack; a hand-wheel journalled adjacent to said driven-shaft; means to couple said hand-wheel operatively with said driven shaft at times, said means including a clutch member, and a safety interlock comprising a clutch-shifting member, and connections, including a control-rod, intermediate said pinion and said clutch-shifting member, said safety inter-lock operating, substantially as described.

4. A safety control for drilling machines; combining a spindle-feeding mechanism including a driven shaft; a plurality of gears arranged for actuation by power; means to connect said gears selectively with said driven-shaft, for power actuation of said driven-shaft; a handwheel journalled adjacent to said driven-shaft, means to couple said handwheel operatively with said driven shaft at times, said means including a clutch-member; and a safety interlock comprising a clutch-shifting member, a control-rod intermediate said clutch-shifting member and said gear-selecting means, and a spring tending to shift said clutch into position for connection of said hand-wheel with said driven-shaft when said gears are disconnected therefrom, said control-rod being operated by said gear-selecting means to shift said clutch, against the action of said spring, to disconnect said hand-wheel from said driven-shaft, when any of said gears are connected thereto.

5. A safety control for drilling machines, combining a spindle-feeding mechanism including a driven-shaft; a plurality of gears arranged for actuation by power, means to connect said gears selectively with said driven-shaft for power actuation thereof, said means comprising a shift-rod provided with a key and having a circular rack, and a rotatable pinion meshing with said rack; a hand-wheel journalled adjacent to said driven-shaft; means to couple said hand-wheel operatively with said driven-shaft at times, said means including a clutch-member, and a safety interlock comprising a clutch-shifting member, a control-member rotatable with said pinion, and a control-rod intermediate said rotatable control-member and said clutch-shifting member, said safety interlock operating to disconnect said hand-wheel from said driven-shaft when any of said gears are connected thereto, and means, including a spring, tending to shift said clutch into position for connection of said hand-wheel with said driven-shaft when said gears are disconnected therefrom.

In witness whereof, I hereunto subscribe my name, as attested by the two subscribing witnesses.

DAVID C. KLAUSMEYER.

Witnesses:
C. C. SLETE,
HILDA HERBERS.